Jan. 12, 1943. V. H. GRANT ET AL 2,307,776
CIRCUIT BREAKER AND SYSTEM OF CONTROL THEREFOR
Filed Dec. 3, 1941
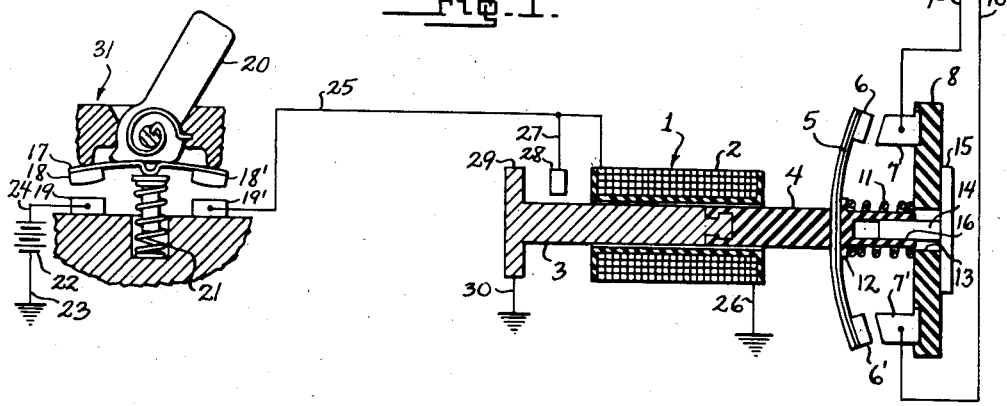
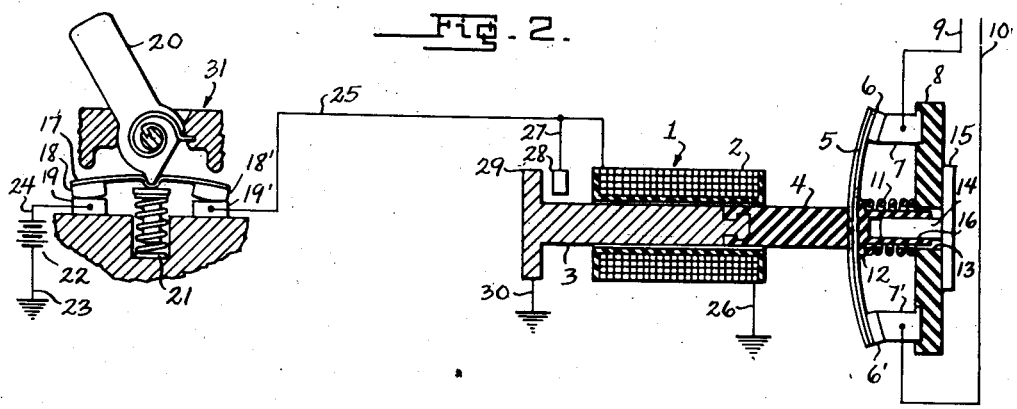
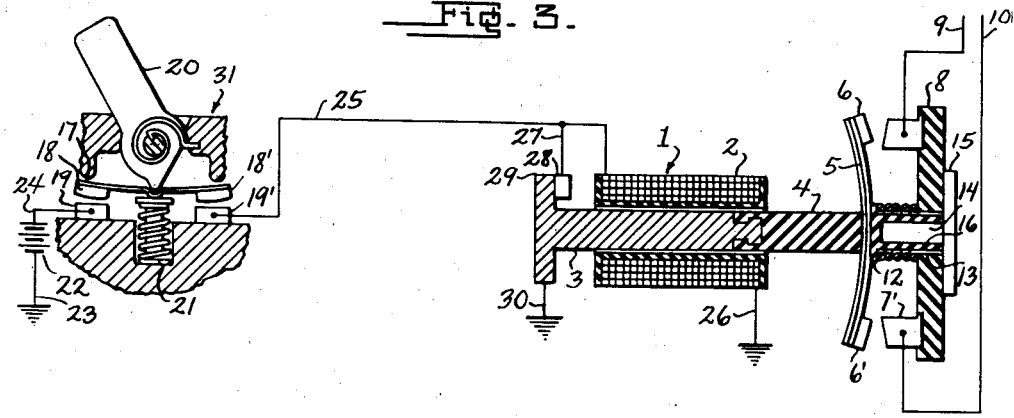
INVENTORS.
V. H. Grant
BY M. A. Knight
ATTORNEY Patented Jan. 12, 1943

2,307,776

UNITED STATES PATENT OFFICE 2,307,776

CIRCUIT BREAKER AND SYSTEM OF CONTROL THEREFOR

Vernon H. Grant, United States Navy, and Milton A. Knight, Washington, D. C.

Application December 3, 1941, Serial No. 421,474

19 Claims. (Cl. 175—294)

(Granted under the act of March 3, 1883, as amended April 30, 1928; 370 O. G. 757)

Our invention relates to circuit breakers for interrupting electric circuits, and particularly to circuit breakers provided with electromagnetically operated closing means and thermally operated opening means.

An object of our invention is to provide an improved circuit breaker of the type described which, when tripped by its thermally operated opening means to open the circuit contacts, will effect a de-energization of the breaker closing means, thereby permitting the breaker mechanism to move to its full open circuit position.

A more specific object is to provide a circuit breaker of the class described utilizing a bimetallic thermal member coupled for movement with the armature of the magnetic closing means to bridge a pair of circuit contacts, the bimetallic member being operable upon a predetermined heating thereof to effect de-energization of the magnetic closing means, thereby permitting the armature thereof to be restored to its full open circuit position.

Still another object is to provide an improved circuit breaker of the class described using a core type armature to which is affixed a bimetallic member for bridging a pair of load circuit contacts, the bimetallic member being operable upon a predetermined heating thereof by the current in the load circuit to open the circuit contacts and to effect de-energization of the magnetic closing means, thereby permitting the armature core thereof to be restored to its full open circuit position.

Another object of our invention is to provide a system for controlling a load circuit breaker of the class described from a remotely positioned auxiliary circuit breaker in which the closing coil of the load breaker is energized through a control circuit, the latter including therein the overload tripping means of the auxiliary circuit breaker so that when the load circuit breaker closing coil is shunted out as the breaker is opened, the resultant increased current flow through the control circuit will also cause operation of the tripping means of the auxiliary circuit breaker which is effective to open the contacts thereof, and hence open the circuit to the closing coil of the load circuit breaker.

A still further specific object of our invention is to provide a system for controlling a load circuit breaker of the class described from a remotely positioned auxiliary breaker in which the closing coil of the load circuit breaker is energized through a control circuit, said circuit including the contacts closed by the auxiliary circuit breaker, the overload protective means therefor and the closing coil of the load breaker connected in series circuit relation so that when the load breaker is tripped out by its overload protective means and its closing coil is shunted out, the resultant increase in current flow through the control circuit will be effective to cause operation of the overload protective means of the auxiliary breaker, thereby tripping the latter to open circuit position and opening the circuit to the closing coil of the load breaker.

These and other objects of our invention will become apparent from the following detailed description and from the drawing in which like reference characters refer to like parts:

Referring now to the drawing, which is illustrative of a preferred embodiment of our invention, Fig. 1 is a diagrammatic view showing the essential parts of the auxiliary and load circuit breakers incorporating our invention with a schematic diagram of the electrical circuits associated therewith, both of said breakers being in full open position.

Fig. 2 shows both breakers in fully closed position, and

Fig. 3 shows both breakers in the positions occupied upon operation of their respective bimetallic members.

With reference now in particular to Fig. 1, our improved circuit breaker system comprises a load circuit breaker 1 and a remotely positioned auxiliary circuit breaker 31.

Circuit breaker 1 is provided with an electromagnetically operated closing coil 2 which has a core type armature member 3. An electrically nonconductive member 4 is fixed to one end of armature member 3 by any suitable means and carries a thermostatic member 5. Member 5 has snap-through and resilient characteristics and while preferably made in the form of a bimetallic disc, it will be evident that other well known thermostatic mechanisms having snap-through and resilient characteristics may also be used. Such discs are well known in the art and their principles of operation are set forth in many patents, such as for example the patent to Spencer, No. 1,895,591. A pair of movable contact members 6 and 6' are affixed to bimetallic member 5 and cooperate with fixed contact members 7 and 7' carried by a supporting plate 8 to control the continuity of a load circuit fed through conductors 9 and 10.

A resilient member comprising an annular coil spring 11 is placed over the free end of member 4. One end of spring 11 abuts a collar 12 formed on member 4 and the other end thereof abuts the supporting plate 8. An aperture 13 is provided in the supporting plate 8. A stud member provided with a shank portion 14 and a flanged head portion 15 is supported on base plate 8 in any suitable manner. The shank portion 14 projecting through the aperture 13 is adapted to enter a bore 16 formed in the end of member 4 to serve as a combined guide and support therefor.

The auxiliary breaker 31, the constructive features of which are not new and which therefore do not form a basis for claims under this application, comprises a snap-through thermostatic member 17 carrying movable contacts 18 and 18' and may be similar in construction to member 5. Contact members 18 and 18' are moved into engagement with stationary contact members 19 and 19' by means of a manually operated lever 20 acting upon bimetallic member 17. Spring member 21 is utilized for restoring bimetallic member 17 and contacts 18 and 18' carried thereby to an open position when member 17 snaps through to the position illustrated in Fig. 3 upon being subjected to a predetermined amount of current.

The circuit for controlling the operation of the load circuit breaker 1 from the auxiliary circuit breaker 31 comprises a battery 22, one side of which is connected to ground by conductor 23. The other side of battery 22 is connected by conductor 24 to fixed contact member 19. A conductor 25 is connected to fixed contact member 19' and leads to one side of closing coil 2 on the load breaker 1. The other side of coil 2 is connected to ground by means of conductor 26. In order to provide means for shunting the coil 2, a conductor 27 is tapped to conductor 25 and connects with a stop member 28 for a flanged portion 29 formed at one end of armature 3. Armature member 3 is connected to ground by means of conductor member 30, and hence when the flange 29 on armature 3 abuts its stop member 28, the circuit for shunting coil 2 to ground is completed.

Our circuit breaker system operates in the following manner:

The auxiliary circuit breaker 31 is closed by moving the operating handle 20 thereof to the position shown in Fig. 2. Such movement completes a circuit from one side of battery 22 through contacts 18 and 19, bimetallic member 17, contacts 18' and 19' through conductor 25 to the closing coil 2 of load breaker 1. Since the other sides of battery 22 and coil 2 are connected to ground through conductors 23 and 26 respectively, current will now flow in said circuit to energize coil 2 and cause its armature member 3 and bimetallic member 5 coupled therewith to move to the right, thus closing the load circuit conductors 9 and 10 through the bimetallic member 5. Such movement will obviously compress spring member 11 and serve to create a restoring force therein. Bimetallic disc member 5 also contains resilient characteristics, and, when urged into engagement with stationary contact members 7 and 7', will have created therein a restoring force which, vectorially speaking, is additive to the restoring force created by the compression of spring 11. The sum of these two restoring forces act in opposition to the force applied to core member 4 upon energization of coil 2, and hence the travel of member 3 will be stopped when the restoring forces created in members 5 and 11 are equal to the force acting upon armature member 3. The load circuit breaker and the auxiliary circuit breaker will then occupy positions as illustrated in Fig. 2.

Should an overload condition occur in the load circuit causing an excessive increase in current through conductors 9 and 10, and hence through bimetallic member 5, the latter will snap or trip through in a well known manner to the position as shown in Fig. 3. With bimetallic member 5 in such position it will be evident that the force opposing travel of armature member 3 which was created in said member while it occupied a position as shown in Fig. 2 is no longer present. Such being the case, armature member 3 will be moved further under the force applied thereto, further increasing the compression of spring member 11 until the flange portion 29 abuts stop member 28. When this occurs, the circuit for shunting coil 2 to ground will be completed as hereinbefore described, effecting de-energization of coil 2. When coil 2 is thus de-energized, the restoring force created in spring member 11 by compression thereof is now effective to move armature member 3 and bimetallic member 5 to their full open circuit positions as shown in Fig. 1.

Also when coil 2 is shunted to ground, it will be evident that the resistance of the control circuit leading to coil 2 from battery 22 will be reduced materially, causing an appreciable increase in current through the bimetallic member 17 of the auxiliary breaker 31. Such increase in current will be effective to cause it also to snap-through and open the control circuit, whereupon the mechanism of the auxiliary breaker will be restored to the position shown in Fig. 1.

In the present embodiment of our invention, the circuit breaker system was designed for aircraft installation where the number of control wires must be kept as low as possible. Hence the utilization of only one wire (conductor 25) from battery 22 to coil 2, the return path for current being supplied through "ground." It will be evident, however, that current return could also be made through a second conductor where conductors are not at a premium.

In conclusion, it will be evident to those skilled in the art that various other changes may be made in the form, details of construction and arrangement of parts herein described without departing from the spirit and scope of our invention. We therefore desire it to be understood that only such limitations as are imposed by the prior art shall be placed upon the appended claims.

The invention described herein may be manufactured and used by or for the Government of the United States of America for governmental purposes without the payment of any royalties thereon or therefor.

Having fully described our invention, we claim:

1. A circuit breaker for controlling a circuit through a pair of circuit contacts comprising an electromagnet having an armature member actuated thereby, a thermally controlled contact bridging member, means coupling said bridging member to said armature member for movement therewith from a rest position upon energization of said magnet to bridge said contacts and thereby close a circuit therethrough, a resilient member deformable by movement of said armature from a rest position, means operable upon a predetermined heating of said thermal means to open the circuit through said bridging member and means then operable to effect deenergization of said magnet whereby the restoring force created in said resilient member by deformation thereof is effective to move said armature and bridging members to their respective rest position.

2. A circuit breaker for controlling a circuit through a pair of circuit contacts comprising a thermostatic member for bridging said contacts, an electromagnet having an armature member, means coupling said armature to said thermostatic member, said armature being movable from a rest position upon energization of said electromagnet to move said thermostatic member to bridging position to thereby close a circuit through said contacts, a resilient member, means for positioning said resilient member to be deformed by movement of said armature from its rest position, means operable upon a predetermined heating of said thermostatic member to open the circuit therethrough and means then operable to effect deenergization of said electromagnet whereby the energy stored in said resilient member by deformation thereof is effective to move said armature and thermostatic members to their respective rest positions.

3. In a circuit breaker for controlling a circuit through a pair of circuit contacts the combination comprising an electro-responsive device including an armature member actuated thereby, a thermostatic member for closing said contacts, means coupling said thermostatic member to said armature for movement therewith, a resilient member, means for positioning said resilient member to be deformed by movement of said armature from its rest position, means for energizing said electro-responsive device to cause said armature and thermostatic members to move against an opposing force created by deformation of said resilient member to close said contacts, said thermostatic member being operable upon a predetermined heating thereof to effect an opening of said contacts, means effective upon operation of said thermostatic member to permit further movement of said armature, and means operable upon further movement of said armature to effect deenergization of said electro-responsive means whereupon the opposing force of said resilient member is effective to move said armature and thermostatic members to their respective initial rest positions.

4. A circuit breaker for controlling a circuit through a pair of circuit contacts comprising an electromagnet including an armature member actuated thereby, a snap-acting thermostatic member for bridging said contacts, means coupling said thermostatic member to said armature for movement therewith, a resilient member, means for positioning said resilient member to be deformed by movement of said armature from a rest position, means for energizing said magnet to cause said armature and thermostatic members to move against the restoring force created by deformation of said resilient member to bridge and close said contacts, said thermostatic member being operable upon a predetermined heating thereof to snap through and open said contacts, means effective upon the operation of said thermostatic member to permit further movement of said armature, and means operable upon further movement of said armature to effect deenergization of said magnet whereupon the restoring force in said resilient member is effective to move said armature and thermostatic members to their respective initial rest positions.

5. In a circuit breaker the combination comprising an electro-responsive device including an armature member actuated thereby, a resilient member, means for positioning said resilient member to oppose movement of said armature upon energization of said electro-responsive device, an inherently deformable thermostatic member for closing a circuit therethrough, means for coupling said thermostatic member to said armature member for movement therewith and in such manner that a second force opposing movement of said armature is created by said thermostatic member when urged into circuit closing position by said armature, means for energizing said electro-responsive device to cause said armature and thermostatic members to move from a rest position against the opposing force of said resilient member into circuit closing position, movement of said armature being stopped when the force applied thereto is balanced by said opposing forces, said thermostatic member being deformed upon a predetermined heating thereof to open said circuit whereby said second opposing force is rendered ineffective thereby permitting further movement of said armature, and means operable upon further movement of said armature to effect deenergization of said electro-responsive device whereupon the opposing force of said resilient member is effective to move said armature and thermostatic members to their respective rest positions.

6. A circuit breaker for controlling a circuit through a pair of circuit contacts comprising an electro-magnet including an armature actuated thereby, a resilient member positioned to oppose movement of said armature from a rest position upon energization of said magnet, a snap-acting thermostatic member for bridging said contacts, means for affixing said thermostatic member to said armature and in such manner that when urged against said contacts a second opposing force additive to the opposing force of said resilient member is created, means for energizing said magnet to cause said armature and thermostatic members to move against the opposing force of said resilient member to bridge said contacts and close a circuit therethrough, said thermostatic member being operable upon a predetermined heating thereof to open said circuit whereby said second opposing force is removed to thereby permit further movement of said armature, and means operable upon further movement of said armature to effect deenergization of said magnet whereupon the opposing force of said resilient member is effective to move said armature and thermostatic members to their respective rest positions.

7. In a circuit breaker the combination comprising an electromagnet including an armature member actuated thereby, a spring member, means for positioning said spring member to oppose movement of said armature upon energization of said magnet, an inherently deformable bimetallic member for closing a circuit therethrough, means for coupling said bimetallic member to said armature member for movement therewith and in such manner that a second force opposing movement of said armature is created by said bimetallic member when urged into circuit-closing position by said armature, means for energizing said magnet to cause said armature and bimetallic members to move from a rest position against the opposing force of said spring member into a circuit-closing position, movement of said armature being stopped when the force applied thereto is balanced by said opposing forces, said bimetallic member being deformed upon a predetermined heating thereof to open said circuit whereby said second opposing force is rendered ineffective thereby permitting further movement of said armature, and means operable upon further movement of said armature to effect deenergization of said magnet whereupon the opposing force of said spring member is effective to move said armature and bimetallic members to their respective rest positions.

8. In a circuit breaker for controlling a circuit through a pair of circuit contacts the combination comprising an electromagnet including a core armature actuated thereby, a resilient member, means for positioning said resilient member to oppose movement of said armature upon energization of said magnet, an inherently deformable thermostatic member for bridging said circuit contacts, means for coupling said thermostatic member to said armature for movement therewith and in such manner that a second force opposing movement of said armature is created by said thermostatic member when urged into engagement with said circuit contacts by movement of said armature member, means for energizing said magnet to cause said armature and thermostatic members to move from a rest position against the opposing force of said resilient member to engage said circuit contacts, movement of said armature being stopped when the force applied thereto is balanced by said opposing forces, said thermostatic member being deformed upon a predetermined heating thereof to open said circuit whereby said second opposing force is rendered ineffective thereby permitting further movement of said armature, and means operable upon further movement of said armature to effect deenergization of said magnet whereupon the opposing force of said resilient member is effective to move said armature and thermostatic members to their respective rest positions.

9. In a circuit breaker the combination comprising an electromagnet including a core armature actuated thereby, a spring member, means for positioning said spring member to oppose movement of said armature upon energization of said magnet, an inherently deformable bimetallic contact bridging member for closing a circuit therethrough, means for coupling said bimetallic member to said armature for movement therewith and in such manner that a second force opposing said armature movement is created by said bimetallic member when urged into circuit closing position by said armature, means for energizing said magnet to cause said armature and bimetallic members to move from a rest position against the opposing force of said spring member into circuit closing position, movement of said armature being stopped when the force applied thereto is balanced by said opposing forces, said bimetallic member being deformed upon a predetermined heating thereof to open said circuit whereby said second opposing force is rendered ineffective thereby permitting further movement of said armature, and means operable upon further movement of said armature to effect deenergization of said magnet whereupon the opposing force of said spring member is effective to move said armature and bimetallic members to their respective rest positions.

10. In a circuit breaker for controlling a circuit through a pair of circuit contacts the combination comprising an electromagnet including a core armature actuated thereby, a spring member, means for positioning said spring member to oppose movement of said armature upon energization of said magnet, an inherently deformable bimetallic member for bridging said circuit contacts, means for affixing said bimetallic member to said armature in such manner that a second force opposing movement of said armature is created by said bimetallic member when urged into engagement against said circuit contacts by said armature, means for energizing said magnet to cause said armature and bimetallic members to move from a rest position against the opposing force of said spring member to engage said circuit contacts, movement of said armature being stopped when the force applied thereto is balanced by said opposing forces, said bimetallic member being deformed upon a predetermined heating thereof to open said circuit whereby said second opposing force is rendered ineffective thereby permitting further movement of said armature, and means operable upon further movement of said armature to effect deenergization of said magnet whereupon the opposing force of said spring member is effective to move said armature and bimetallic members to their respective rest positions.

11. In a circuit breaker for controlling a circuit through a pair of circuit contacts the combination comprising an electromagnet including a core armature actuated thereby, a spring member, means for positioning said spring member for compression by said armature member, the restoring force created in said spring member by compression thereof being such as to oppose movement of said armature upon energization of said magnet, a snap-acting bimetallic member for bridging said circuit contacts, means for affixing said bimetallic member to one end of said armature and in such manner that a second force opposing movement of said armature is created by said bimetallic member when urged into engagement with said contacts by said armature, means for energizing said magnet to cause said armature and bimetallic members to move from a rest position against the opposing force of said spring member into contact bridging position, movement of said armature being stopped when the force applied thereto is balanced by said opposing forces, said bimetallic member being operable upon a predetermined heating thereof to break engagement with said contacts whereby said second opposing force is rendered ineffective thereby permitting further movement of said armature, and means operable upon further movement of said armature to effect deenergization of said magnet whereupon the opposing force of said spring member is effective to move said armature and bimetallic members to their respective rest positions.

12. In a circuit breaker system, a load breaker including electro-responsive actuating means therefor, said electro-responsive actuating means being operable when energized to close said breaker and a load circuit therethrough, and when deenergized to open said breaker, a power supply, control circuit means leading from said power supply to said electro-responsive actuating means, an auxiliary breaker included in said control circuit, said auxiliary breaker being operable when closed to connect said electro-responsive means to said power supply, means for opening said auxiliary breaker, means effective upon an abnormal electrical condition in said load circuit to increase current flow through said control circuit, and means responsive to said increase in current to effect operation of the opening means associated with said auxiliary breaker thereby effecting deenergization of said electro-responsive actuating means of said load breaker causing the latter to open.

13. In a circuit breaker system, in combination, a load breaker including load circuit closing means and electro-responsive means operable when energized to actuate said closing means, a power supply, control circuit means leading from said power supply to said electro-responsive means, an auxiliary circuit breaker included in said control circuit, said auxiliary circuit breaker being operable when closed to connect said electro-responsive means to said power supply, means for opening said auxiliary breaker, means effective upon an abnormal electrical condition in said load circuit to increase current flow through said control circuit, and means responsive to said increase in current to effect operation of the opening means associated with said auxiliary breaker thereby effecting deenergization of said electro-responsive means on said load breaker.

14. In a circuit breaker system, in combination, a load breaker including load circuit closing means and electro-responsive means operable when energized to actuate said closing means, a power supply, control circuit means leading from said power supply to said electro-responsive means, an auxiliary circuit breaker included in said control circuit, said auxiliary circuit breaker being operable when closed to connect said electro-responsive means to said power supply, means for opening said auxiliary breaker, means effective upon an abnormal electrical condition in said load circuit to open said load circuit at said load circuit closing means and to increase current flow through said control circuit, and means responsive to said increase in current to effect operation of the opening means associated with said auxiliary breaker.

15. In a circuit breaker system, in combination, a load breaker including load circuit closing means and electro-responsive means for actuating said closing means, a power supply for energizing said electro-responsive means, control circuit means connecting said power supply to said electro-responsive means, an auxiliary breaker connected in said control circuit to control the continuity thereof, means for opening each of said breakers, means responsive to an abnormal electrical condition in said load circuit for effecting operation of the opening means associated with said load breaker, means for shunting out the electro-responsive means of said load breaker upon opening thereof and to thereby increase current flow through said control circuit means, and means responsive to said increase in current to effect operation of the opening means asssociated with said auxiliary breaker.

16. In a circuit breaker system, in combination, a load breaker including load circuit closing means and electro-magnetically operated means for actuating said closing means, a power supply for energizing said electromagnetic means, control circuit means connecting said power supply to said electromagnetic means, an auxiliary breaker connected in said control circuit to control the continuity thereof, overload protective means included in said load and control circuits for opening the load and auxiliary breakers respectively, and means operable upon an overload opening operation of said load breaker to shunt said electromagnetic means out of said control circuit thereby causing an increase in current in last said circuit and which increase is effective to render operable the overload protective means associated with said auxiliary breaker.

17. In a circuit breaker system, in combination, a load breaker including load circuit closing means, electromagnetically operated means for actuating said closing means and circuit overload protective means for opening said breaker, a power source for energizing said electromagnetic means, control circuit means connecting said source of power to said electromagnetic means, an auxiliary breaker including a snap-acting thermostatically operable contact bridging member connected in said control circuit to control the continuity thereof, and means operable upon an overload opening operation of said load breaker to shunt said electromagnetic means out of said control circuit thereby increasing current flow in said circuit and which increase is effective to render operable the thermostatically controlled bridging member of said auxiliary breaker and open said control circuit.

18. In a circuit breaker system, in combination, a load breaker including a snap-acting thermostatically operable load circuit contact bridging member and electromagnetically operated means for actuating said bridging member to a closed position, a power supply for energizing said electromagnetic means, control circuit means connecting said power supply to said electromagnetic means, an auxiliary breaker connected in said control circuit to control the continuity thereof, protective means included in said control circuit for opening said auxiliary breaker, said thermostatic member being operable upon an overload current condition therein to open said load circuit, and means effective upon operation of said thermostatic member to shunt said electromagnetic means out of said control circuit thereby increasing flow of current in said circuit and which increase is effective to render operable the protective means for opening said auxiliary breaker.

19. In a circuit breaker system, in combination, a load breaker including a snap-acting thermostatically operable load circuit contact bridging member and electromagnetically operated means for actuating said bridging member to a closed position, a source of power for energizing said electromagnetic means, control circuit means connecting said source of power to said electromagnetic means, an auxiliary breaker including a snap-acting thermostatically operable contact bridging member connected in said control circuit to control the continuity thereof, said thermostatic member associated with said load breaker being operable upon an overload current condition therein to open said load circuit and means effective upon the operation of said load breaker thermostatic member to shunt said electromagnetic means out of said control circuit thereby increasing flow of current in said circuit and through the thermostatic member of said auxiliary breaker to also effect an opening of said control circuit.

VERNON H. GRANT.
MILTON A. KNIGHT.